United States Patent [19]

Lee et al.

[11] Patent Number: 5,047,468

[45] Date of Patent: Sep. 10, 1991

[54] PROCESS FOR THE IN SITU BLENDING OF POLYMERS

[75] Inventors: Kiu H. Lee, South Charleston, W. Va.; Frederick J. Karol, Belle Mead, N.J.; Sari B. Samuels, North Woodmere, N.Y.

[73] Assignee: Union Carbide Chemicals and Plastics Technology Corporation, Danbury, Conn.

[21] Appl. No.: 271,639

[22] Filed: Nov. 16, 1988

[51] Int. Cl.$^5$ .................. C08F 297/08; C08L 23/20; C08L 23/08

[52] U.S. Cl. .................................. 525/53; 525/240; 525/247

[58] Field of Search ................................ 525/53, 247

[56] References Cited

U.S. PATENT DOCUMENTS

| | | | |
|---|---|---|---|
| 4,048,412 | 9/1977 | Caumartin et al. | 526/65 |
| 4,303,771 | 12/1981 | Wagner et al. | 526/129 |
| 4,482,687 | 11/1984 | Noshay et al. | 526/125 |
| 4,525,322 | 6/1985 | Page et al. | 264/531 |
| 4,703,094 | 10/1987 | Raufast | 526/65 |

FOREIGN PATENT DOCUMENTS 40992 12/1981 European Pat. Off.

*Primary Examiner*—Carman J. Seccuro
*Attorney, Agent, or Firm*—Saul R. Bresch

[57] ABSTRACT

A process for the in situ blending of polymers comprising continuously contacting, under polymerization conditions, a mixture of ethylene and at least one alpha-olefin having at least 3 carbon atoms present in an amount of about 0.1 to 3.5 mole per mole of ethylene with a catalyst in at least two fluidized bed reactors connected in series, said catalyst comprising:

(i) a complex consisting essentially of magnesium titanium, a halogen, and an electron donor;

(ii) at least one activator compound for the complex having the formula $AlR''_eX'_fH_g$ wherein $X'$ is Cl or $OR'''$; $R''$ and $R'''$ are saturated aliphatic hydrocarbon radicals having 1 to 14 carbon atoms and are alike or different; $f$ is 0 to 1.5; $g$ is 0 or 1; and $e+f+g=3$; and (iii) a hydrocarbyl aluminum cocatalyst, the polymerization conditions being such that ethylene copolymer having a high melt index in the range of about 0.1 to about 1000 grams per 10 minutes is formed in at least one reactor and ethylene copolymer having a low melt index in the range of about 0.001 to about 1.0 gram per 10 minutes is formed in at last one other reactor, each copolymer having a density of about 0.860 to about 0.965 gram per cubic centimeter and a melt flow ratio in the range of about 22 to about 70, with the proviso that:

(a) the mixture of copolymer of ethylene and active catalyst formed in one reactor in the series is transferred to the immediately succeeding reactor in the series; and (b) additionally hydrocarbyl aluminum cocatalyst is introduced into each reactor in an amount sufficient to restore the activity of the catalyst transferred from the preceding reactor.

5 Claims, No Drawings

5,047,468

PROCESS FOR THE IN SITU BLENDING OF POLYMERS

TECHNICAL FIELD

This invention relates to a process for polymerization whereby resins are manufactured and blended in situ.

BACKGROUND ART

There has been a rapid growth in the market for linear low density polyethylene (LLDPE) particularly resin made under mild operating conditions, typically at pressures of 100 to 300 psi and reaction temperatures of less than 100° C. This low pressure process provides a broad range of LLDPE products for film, injection molding, extrusion coating, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of applications.

LLDPE resins designed for commodity type applications typically incorporate 1-butene as the comonomer. The use of a higher molecular weight alpha-olefin comonomer produces resins with significant strength advantages relative to 1-butene copolymers. The predominant higher alpha olefins in commercial use are 1-hexene, 1-octene, and 4 methyl-1-pentene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polymer increases, the processability of the resin usually decreases. By providing a blend of polymers, the properties characteristic of high molecular weight resins can be retained and processability, particularly extrudability, can be improved.

Three major strategies have been proposed for the production of resins of this nature. One is post reactor or melt blending, which suffers from the disadvantages brought on by the requirement of complete homogenization and attendant high cost. A second is the direct production of resins having these characteristics via a single catalyst or catalyst mixture in a single reactor. Such a process would provide the component resin portions simultaneously in situ, the resin particles being ultimately mixed on the subparticle level. In theory, this process should be the most rewarding, but, in practice, it is difficult to achieve the correct combination of catalyst and process parameters necessary to obtain the wide diversity of molecular weights required. The third strategy makes use of multistage reactors, the advantage being that a quite diverse average molecular weight can be produced in each stage, and yet the homogeneity of the single reactor process can be preserved. Furthermore, two or more reactors running under their own set of reaction conditions permit the flexibility of staging different variables. To this end, many versions of multistage reactor processes have been offered, but optimization has been elusive.

DISCLOSURE OF THE INVENTION

An object of this invention is to provide an optimized process for the multistage in situ blending of polymers to provide the desired properties as well as processability.

Other objects and advantages will become apparent hereinafter.

According to the present invention, a process for the in situ blending of polymers has been discovered comprising continuously contacting, under polymerization conditions, a mixture of ethylene and at least one alpha-olefin having at least 3 carbon atoms with a catalyst in at least two fluidized bed reactors connected in series, said catalyst comprising:

(i) a complex consisting essentially of magnesium, titanium, a halogen, and an electron donor; and (ii) at least one activator compound for the complex having the formula $AlR''_eX'_fH_g$ wherein $X'$ is Cl or $OR'''$; $R''$ and $R'''$ are saturated aliphatic hydrocarbon radicals having 1 to 14 carbon atoms and are alike or different; f is 0 to 1.5; g is 0 or 1; and $e+f+g=3$; and (iii) a hydrocarbyl aluminum cocatalyst, the polymerization conditions being such that ethylene copolymer having a high melt index in the range of about 0.1 to about 1000 grams per 10 minutes is formed in at least one reactor and ethylene copolymer having a low melt index in the range of about 0.001 to about 1.0 gram per 10 minutes is formed in at least one other reactor, each copolymer having a density of about 0.860 to about 0.965 gram per cubic centimeter and a melt flow ratio in the range of about 20 to about 70, and being admixed with active catalyst, with the proviso (a) the mixture of copolymer of ethylene and active catalyst formed in one reactor in the series is transferred to the immediately succeeding reactor in the series;

(b) in the reactor in which the low melt index copolymer is made:

(1) the alpha-olefin is present in a ratio of about 0.02 to about 3.5 moles of alpha-olefin per mole of ethylene; and (2) hydrogen is optionally present in a ratio of about 0.005 to about 0.5 mole of hydrogen per mole of combined ethylene and alpha olefin;

(c) in the reactor in which the high melt index copolymer is made:

(1) the alpha-olefin is present in a ratio of about 0.02 to about 3.5 moles of alpha olefin per mole of ethylene; and (2) hydrogen is present in a ratio of about 0.05 to about 3 moles of hydrogen per mole of combined ethylene and alpha olefin; and (d) additional hydrocarbyl aluminum cocatalyst is introduced into each reactor in the series following the first reactor in an amount sufficient to restore the level of the activity of the catalyst transferred from the preceding reactor in the series to about the initial level of activity in the first reactor.

DETAILED DESCRIPTION

The titanium based complex is exemplified by a complex having the formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms; each OR group is alike or different; X is Cl, Br, or I, or mixtures thereof; ED is an electron donor, which is a liquid Lewis base in which the precursors of the titanium based complex are soluble; a is 0.5 to 56; b is 0, 1, or 2 c is 2 to 116; and d is 2 to 85. This complex and a method for its preparation are disclosed in U.S. Pat. No. 4,303,771, issued on Dec. 1, 1981 which is incorporated by reference herein.

The titanium compound, which can be used in the above preparations, has the formula $Ti(OR)_aX_b$ wherein R and X are as defined for component (i) above; a is 0, 1 or 2; b is 1 to 4; and a+b is 3 or 4. Suitable compounds are $TiCl_3$, $TiCl_4$, $Ti(OC_6H_5)Cl_3$, $Ti(OCOCH_3)Cl_3$ and $Ti(OCOC_6H_5)Cl_3$.

The magnesium compound has the formula $MgX_2$ wherein X is as defined for component (i) above. Suitable examples are $MgCl_2$, $MgBr_2$, and $MgI_2$. Anhydrous $MgCl_2$ is a preferred compound. About 0.5 to 56, and preferably about 1 to 10, moles of the magnesium compound are used per mole of titanium compound.

The electron donor used in the catalyst composition is an organic compound, liquid at temperatures in the range of about 0° C. to about 200° C. It is also known as a Lewis base. The titanium and magnesium compounds are both soluble in the electron donor.

Electron donors can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkyaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di n-propyl ether, dibutyl ether, ethyl formate, methyl acetate, ethyl anisate, ethylene carbonate, tetrahydropyran, and ethyl propionate.

The activator compound can be represented by the formula $AlR''_eX'_fH_g$ wherein X' is Cl or OR'''; R'' and R''' are saturated aliphatic hydrocarbon radicals having 1 to 14 carbon atoms and are alike or different; f is 0 to 1.5; g is 0 or 1; and e+f+g=3. Examples of suitable R, R', R'', and R''' radicals are: methyl, ethyl, propyl, isopropyl, butyl, isobutyl, tert butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, cyclohexyl, cycloheptyl, and cyclooctyl. Examples of suitable R and R' radicals are phenyl, phenethyl, methyloxyphenyl, benzyl, tolyl, xylyl, naphthyl, naphthal, methylnaphthyl.

Some examples of useful activator compounds are as follows: triisobutylaluminum, trihexylaluminum, di isobutylaluminum hydride, dihexylaluminum hydride, di isobutylhexylaluminum, trimethylaluminum, triethylaluminum, diethylaluminum chloride, $Al_2(C_2H_5)_3Cl_3$, and $Al(C_2H_5)_2(OC_2H_5)$. The preferred activators are triethylaluminum, triisobutylaluminum, and diethylaluminum chloride. The cocatalyst can be selected from among those compounds suggested as activators, which are hydrocarbyl aluminum compounds. Triethylaluminum and triisobutylaluminum are preferred cocatalysts.

While it is not necessary to support the complex or catalyst precursor mentioned above, supported catalyst precursors do provide superior performance and are preferred. Silica is the preferred support. Other suitable inorganic oxide supports are aluminum phosphate, alumina, silica/alumina mixtures, silica modified with an organoaluminum compound such as triethylaluminum, and silica modified with diethylzinc. A typical support is a solid, particulate material essentially inert to the polymerization. It is used as a dry powder having an average particle size of about 10 to 250 microns and preferably about 30 to about 100 microns; a surface area of at least about 3 square meters per gram and preferably at least about 50 square meters per gram; and a pore size of at least about 80 Angstroms and preferably at least about 100 Angstroms. Generally, the amount of support used is that which will provide about 0.01 to about 0.5 millimole of transition metal per gram of support and preferably about 0.2 to about 0.35 millimole of transition metal per gram of support. Impregnation of the abovementioned catalyst precursor into, for example, silica is accomplished by mixing the complex and silica gel in the electron donor solvent followed by solvent removal under reduced pressure.

The activator can be added to the titanium complex either before or during the polymerization reaction. It is usually introduced before polymerization, however. In each reactor, the cocatalyst can be added either before or during the polymerization reaction; however, it is preferably added neat or as a solution in an inert solvent, such as isopentane, to the polymerization reaction at the same time as the flow of ethylene, alpha olefin, and hydrogen, if any, is initiated.

Useful molar ratios are about as follows:

| Titanium based catalyst | Broad | Preferred |
| --- | --- | --- |
| 1. Mg:Ti | 0.5:1 to 56:1 | 1.5:1 to 5:1 |
| 2. Mg:X | 0.005:1 to 28:1 | 0.075:1 to 1:1 |
| 3. Ti:X | 0.01:1 to 0.5:1 | 0.05:1 to 0.2:1 |
| 4. Mg:ED | 0.005:1 to 28:1 | 0.15:1 to 1.25:1 |
| 5. Ti:ED | 0.01:1 to 0.5:1 | 0.1:1 to 0.25:1 |
| 6. activator:Ti | 0.5:1 to 50:1 | 1:1 to 5:1 |
| 7. cocatalyst:Ti | 0.1:1 to 200:1 | 10:1 to 100:1 |
| 8. ED:Al | 0.05:1 to 25:1 | 0.2:1 to 5:1 |

The polymerization in each reactor is conducted in the gas phase using a continuous fluidized bed process. A typical fluidized bed reactor is described in U.S. Pat. No. 4,482,687 issued on Nov. 13, 1984. This patent is incorporated by reference herein. As noted, the reactors are connected in series. While two reactors are preferred, three or more reactors can be used to further vary the molecular weight distribution. As more reactors are added producing different average molecular weight distributions, however, the sharp diversity of which two reactors are capable becomes less and less apparent. It is contemplated that these additional reactors could be used to produce copolymers with melt indices intermediate to the high and low melt indices previously referred to.

The various melt indices can be prepared in any order, i.e., in any reactor in the series. For example, the low melt index copolymer can be made in the first or second reactor in the series and the high melt index copolymer can be made in the first or second reactor as well. They must be made sequentially, however, to achieve the desired homogeneity.

The high melt index is in the range of about 0.1 to about 1000 grams per 10 minutes and is preferably in the range of about 0.2 to about 600 grams per 10 minutes. The low melt index is in the range of about 0.001 to about 1.0 gram per 10 minutes and is preferably in the range of about 0.01 to about 0.2 gram per 10 minutes. The melt flow ratio is, however, about the same in both reactors, i.e., in the range of about 20 to about 70. It depends on the density and melt index.

Melt index is determined under ASTM D-1238, Condition E. It is measured at 190° C. and reported as grams per 10 minutes.

Melt flow ratio is the ratio of flow index to melt index. Flow index is determined under ASTM D 1238, Condition F. It is measured at 10 times the weight used in determining the melt index.

The titanium complex including the activator, the cocatalyst, the ethylene monomer, any comonomers, and hydrogen, if any, are continuously fed into each reactor and ethylene copolymer and active catalyst are continuously removed from one reactor and introduced into the next reactor. The product is continuously removed from the last reactor in the series.

The alpha olefin used to produce the polyethylene can have 3 to 10 carbon atoms and preferably has 3 to 8 carbon atoms. Preferred alpha olefins are 1-butene, propylene, 1-hexene, 1-octene, 4-methyl-1-pentene. The density of the ethylene copolymer can be varied depending on the amount of alpha olefin comonomer added and upon the particular comonomer employed. The greater the percent of alpha-olefin comonomer, the lower the density. The density of the polyethylene is about 0.860 to about 0.955 gram per cubic centimeter.

The mole ratio of alpha olefin to ethylene used to obtain the high melt index and the low melt index is in the range of about 0.02:1, or 0.1:1, to about 3.5:1. The ratios depend upon the amount of hydrogen, the amount of comonomer, and the density and melt index desired.

Both the comonomer and hydrogen can act as chain terminators. In subject process, hydrogen is required in the high melt index reactor.

The mole ratio of hydrogen to combined ethylene and alpha-olefin in the high melt index reactor is in the range of about 0.05:1 to 3.5:1 and is preferably in the range of about 0.5:1 to 2:1. In the low melt index reactor the hydrogen is optional. If used, the mole ratio of hydrogen to combined ethylene and alpha olefin is in the range of about 0.005:1 to 0.5:1 and is preferably in the range of about 0.01:1 to 0.3:1.

The fluidized bed polymerizations are conducted at a temperature below the sintering temperature of the product. The operating temperature is generally in the range of about 10° C. to about 115° C. Preferred operating temperatures will vary depending upon the density desired. Low density polyethylenes ranging in density from about 0.860 to about 0.910 gram per cubic centimeter are preferably produced at an operating temperature of about 10° C. to about 80° C. The higher temperatures are used to achieve higher densities.

The high melt index reactor can be operated in the range of about 30° C. to about 105° C. and is preferably operated in the range of about 75° C. to about 90° C. The low melt index reactor can be operated in the same range, the higher density resins utilizing the high end of the range. Insofar as pressures are concerned, the high melt index reactor can be operated at about 100 to about 1000 psig and preferably at about 100 to about 350 psig. The low melt index reactor can be operated at similar pressures.

Other conditions in the reactors can be about as follows:

| | BROAD RANGE | PREFERRED RANGE |
|---|---|---|
| LOW MELT INDEX REACTOR | | |
| 1. residence time (hour): | 1 to 10 | 2 to 5 |
| 2. fluidizing gas velocity (foot per second): | 1 to 3.5 | 1.5 to 2.5 |
| 3. low melt index copolymer (percent by weight based on total copolymer produced in two reactors): | 10 to 90 | 40 to 70 |
| HIGH MELT INDEX REACTOR | | |
| 1. residence time (hours): | 1 to 10 | 2 to 5 |
| 2. fluidizing gas velocity (foot per second): | 1 to 3.5 | 1.5 to 2.5 |
| 3. high melt index copolymer (percent by weight based on total copolymer produced in two reactors): | 10 to 80 | 20 to 75 |

An example of properties obtained from a two reactor (or two stage) process:
1. First reactor copolymer:
   Melt Index = 250 grams/10 min
   Density = 0.930 gram/cc.
   Melt Flow Ratio = 25
2. Second reactor copolymer
   Melt Index = 0.1 to 1.0 grams/10 min
   Density = 0.915 to 0.918 gram/cc
   Melt Flow Ratio = 25
3. Homogeneous mixture of both copolymers from second reactor:
   Melt Index: 0.3 to 1.3 grams/10 min
   Density = 0.915 to 0.926 gram/cc
   Melt Flow Ratio = 50 to 68

The first reactor is generally smaller in size than the second reactor because only a portion of the polymer is made in the first reactor. The mixture of copolymer and an active catalyst is usually transferred from the first reactor to the second reactor via an interconnecting device using nitrogen or second reactor recycle gas as a transfer medium.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and in the bed, a reaction zone. Both are above the gas distribution plate.

Advantages of the product of subject process are the homogeneity and uniformity of the physical properties throughout the blend and the high strength and toughness obtained without processing difficulty.

The invention is illustrated by the following examples.

EXAMPLES 1 to 3

The examples are carried out in accordance with the procedure described above.

A catalyst is prepared from a mixture of $MgCl_2/TiCl_3/0.33AlCl_3$/tetrahydrofuran supported on silica that has been dehydrated at 600° C. under a nitrogen atmosphere. [Note: one commercial form of $TiCl_3$ contains an aluminum impurity due to the way the $TiCl_4$ is reduced to $TiCl_3$. This form is used in the examples. A form of $TiCl_3$, which does not contain aluminum, can also be used, e.g., a form known as hydrogen-reduced $TiCl_3$. ] The support is treated with triethyl aluminum to passivate the surface through reaction with the remaining surface silanol groups, and with diethyl aluminum chloride and tri n-hexyl aluminum to moderate the kinetic reaction behavior of the catalyst and promote good resin particle shape, i.e., substantial absence of particle which are "blown open" and a minimum of hollow particles.

The catalyst is made in a two-step process. The magnesium chloride/titanium chloride/tetrahydrofuran salt is impregnated into the silica support from the tetrahydrofuran solvent. The composition of the catalyst precursor is as follows:

| component | percent by weight |
|---|---|
| $TiCl_3$ | 5.97 |
| $MgCl_2$ | 8.58 |
| tetrahydrofuran | 15.00 |
| support (silica treated with $Al(C_2H_5)_3$) | 70.45 |
| | 100.00 |

Analysis of the catalyst precursor:

| component | percent by weight |
|---|---|
| Ti | 1.437 |
| Mg | 2.188 |
| Al | 1.182 |
| Cl | 10.650 |
| tetrahydrofuran | 15.000 |
| silica | 69.543 |
| | 100.000 |

The precursor is contacted with diethyl aluminum chloride and tri n-hexyl aluminum in an isopentane solvent; the residue is dried, and the catalyst is ready for use in the first reactor. The diethyl aluminum chloride and tri n hexyl aluminum are added in amounts based on the tetrahydrofuran content. The diethyl aluminum chloride is added first at a mole ratio of 0.2/1 based on tetrahydrofuran. The tri n-hexyl aluminum is then added at a mole ratio of 0.2:1 based on the tetrahydrofuran. The finished catalyst is dried to a free flowing powder having the following composition:

| component | percent by weight |
|---|---|
| Ti | 1.24 |
| Mg | 1.888 |
| Al (total) | 3.43 |
| Cl (from Ti and Mg) | 9.19 |
| tetrahydrofuran | 12.94 |
| diethyl aluminum chloride | 4.31 |
| tri-n-hexyl aluminum | 10.14 |

Polymerization is initiated in the first reactor by continuously feeding the above catalyst and a cocatalyst, triethylaluminum (TEAL), into a fluidized bed of polyethylene granules together with the gaseous comonomers and hydrogen. The TEAL is dissolved in isopentane (5 percent by weight TEAL). The resulting copolymer mixed with active catalyst is withdrawn from the first reactor and transferred to the second reactor using nitrogen as a transfer medium. The second reactor also has a fluidized bed of polyethylene granules. Again gaseous comonomers and hydrogen are introduced into the second reactor where they come in contact with the copolymer and catalyst from the first reactor. Additional cocatalyst is also introduced. The copolymer product is continuously removed. Variables with respect to catalyst and conditions as well as the properties of the resin product are set forth in the Table.

TABLE

| Example | 1 | | | 2 | | | 3 | | |
|---|---|---|---|---|---|---|---|---|---|
| | Reactor I | Reactor II | final | Reactor I | Reactor II | final | Reactor I | Reactor II | final |
| Catalyst | | | | | | | | | |
| Ti Loading (millimole per gram of support) | 0.25 | 0.25 | | 0.25 | 0.25 | | 0.25 | 0.25 | |
| Mg/Ti (atomic ratio) | 3.0 | 3.0 | | 3.0 | 3.0 | | 3.0 | 3.0 | |
| Ti (weight % based on weight of total catalyst) | 1.0 | 1.0 | | 0.94 | 0.94 | | 1.0 | 1.0 | |
| Al (weight % based on weight of total catalyst) | 2.88 | 2.88 | | 2.73 | 2.73 | | 2.87 | 2.87 | |
| TEAL (weight % based on weight of silica) | 5 | 5 | | 5 | 5 | | 5 | 5 | |
| Reaction Conditions | | | | | | | | | |
| Reactor temperature (°C.) | 86 | 86 | | 86 | 86 | | 80 | 82 | |
| Reactor pressure (psia) | 314.7 | 314.7 | | 314.7 | 314.7 | | 314.7 | 314.7 | |
| Hydrogen/ethylene (mole ratio) | 1.21 | 0.151 | | 1.47 | 0.0819 | | 1.93 | 0.0443 | |
| Comonomer | 1-butene | 1-butene | | 1-butene | 1-butene | | 1-hexene | 1-hexene | |
| Comonomer/ethylene (mole ratio) | 0.319 | 0.378 | | 0.317 | 0.366 | | 0.131 | 0.1847 | |

TABLE -continued

| Example | 1 | | | 2 | | | 3 | | |
| --- | --- | --- | --- | --- | --- | --- | --- | --- | --- |
| | Reactor I | Reactor II | final | Reactor I | Reactor II | final | Reactor I | Reactor II | final |
| Ethylene partial pressure (psia) | 82 | 143 | | 79 | 154 | | 73 | 147 | |
| Nitrogen (% of total reactor pressure) | 33 | 29 | | 30 | 28 | | 21 | 42 | |
| Fluidization velocity (feet per second) | 1.8 | 2.0 | | 1.8 | 2.0 | | 1.8 | 2.0 | |
| Percent of total production | 62 | 38 | | 55 | 45 | | 39 | 61 | |
| Fluidized bed weight (pounds) | 60 | 140 | | 60 | 140 | | 60 | 120 | |
| Production rate (pounds per hour) | 28.3 (Est.) | 45.8 | | 23.7 (Est.) | 42.8 | | 18.0 (Est.) | 46 | |
| Fluidized bed volume (cubic feet) | 3.9 | 9.8 | | 3.6 | 9.5 | | 4.2 | 9.2 | |
| Space/time/yield (pounds per hour per cubic foot) | 7.2 | 4.7 | | 6.6 | 4.5 | | 4.3 | 5.0 | |
| residence time (hours) | 2.1 (Est.) | 3.1 | | 2.5 (Est.) | 3.3 | | 3.3 (Est.) | 2.6 | |
| TEAL feed rate (cubic centimeters per hour) | 110 | 125 | | 113 | 138 | | 166 | 83 | |
| Catalyst feeder (revolutions per minute) | 100 | — | | 250 | — | | 250 | — | |
| Resin Properties | | | | | | | | | |
| Melt Index (grams per 10 minutes) | 122 | 1.0 | 3.9 | 242 | 0.3 | 1.3 | 325 | 0.07 | 0.23 |
| Flow Index | 2953 | 145 | 145 | — | 59 | 59 | — | 11.6 | 11.6 |
| Melt Flow Ratio | 24.3 | 24 | 35 | 24 | 25 | 46 | 25 | 25 | 51 |
| Density (gram per cubic centimeter) | 0.930 | 0.920 | 0.925 | 0.931 | 0.920 | 0.925 | 0.930 | 0.915 | 0.922 |
| Ash (weight % based on the weight of the product) | — | 0.025 | 0.025 | — | 0.031 | 0.031 | — | 0.022 | 0.022 |
| Bulk density of product (pounds per cubic foot) | 20.4 | 19.0 | 19.1 | 22.4 | 19.0 | 19.7 | 18.9 | 18.0 | 17.4 |
| Average particle size (inch) | 0.0195 | 0.030 | 0.0288 | 0.0148 | 0.0297 | 0.0297 | 0.0137 | 0.0296 | 0.0296 |
| Fines (weight % based on the weight of the product - less than 120 mesh) | 2.7 | 0.5 | 2.4 | 3.4 | 0.6 | 3.0 | 2.2 | 0.0 | 2.0 |
| Residual Ti (parts per million) | — | 1.4 | 1.4 | — | 1.4 | 1.7 | — | 1.4 | 2.0 |

Notes to Table:
1. DEAC = diethylaluminum chloride
2. THF = tetrahydrofuran
3. Total catalyst = Ti complex, i.e., titanium, magnesium, halogen, DEAC and THF; silica support; and cocatalyst
4. Residence time = average time each active catalyst particle is in the reactor.
5. Melt Index is determined under ASTM D-1238, Condition E. It is measured at 190° C.
6. Flow Index is determined under ASTM D-1238, Condition F. It is measured at 10 times the weight used in the melt index test above.
7. Melt Flow Ratio is the ratio of the Flow Index to the Melt Index.
8. The resin properties set forth under Reactor II are estimated. The resin properties set forth under final are the average values for the products of Reactors I and II.

We claim:

1. A process for the in situ blending of polymers wherein a higher density ethylene copolymer matrix is prepared in a high melt index reactor and a lower density ethylene copolymer is then incorporated into the ethylene copolymer matrix in a low melt index reactor comprising continuously contacting, under polymerization conditions, a mixture of ethylene and one alpha-olefin having 4 or 6 carbon atoms with a catalyst in two fluidized bed reactors connected in series, said catalyst comprising:

(i) a silica supported complex consisting essentially of magnesium, titanium, halogen, an electron donor, and at least one activator compound having the formula $AlR''_eX'_fH_g$ wherein $X'$ is Cl or $OR'''$; $R''$ and $R'''$ are saturated aliphatic hydrocarbon radicals having 1 to 14 carbon atoms and are the same or different; f is 0 to 1.5; g is 0 or 1; and $e+f+g=3$; and (ii) a hydrocarbyl aluminum cocatalyst, the polymerization conditions being such that an ethylene copolymer matrix having a melt index in the range of about 122 to about 600 grams per 10 minutes is formed in the high melt index reactor and a lower density ethylene copolymer having a melt index in the range of about 0.1 to about 1 gram per 10 minutes is formed in the low melt index reactor, each copolymer having a density of about 0.860 to about 0.965 gram per cubic centimeter and a melt flow ratio in the range of about 22 to about 70, and being admixed with active catalyst, with the provisos that:

(a) the mixture of ethylene copolymer matrix and active catalyst formed in the high melt index reactor is transferred to the low melt index reactor;

(b) other than the active catalyst referred to in proviso (a) and the cocatalyst referred to in proviso (e), no additional catalyst is introduced into the low melt index reactor;

(c) in the high melt index reactor:
  (1) the alpha-olefin is present in a ratio of about 0.1 to about 3.5 moles of alpha-olefin per mole of ethylene; and (2) hydrogen is present in a ratio of about 0.5 to about 2 moles of hydrogen per mole of combined ethylene and alpha-olefin;
(d) in the low melt index reactor:
  (1) the alpha-olefin is present in a ratio of about 0.1 to about 3.5 moles of alpha-olefin per mole of ethylene; and
  (2) hydrogen is present in a ratio of about 0.01 to about 0.3 mole of hydrogen per mole of combined ethylene and alpha-olefin; and
(e) additional hydrocarbyl aluminum cocatalyst is introduced into the low melt index reactor in an amount sufficient to restore the level of activity of the catalyst transferred from the high melt index reactor to about the initial level of activity in the high melt index reactor.

2. The process defined in claim 1 wherein the activator compound is at least one of triethylaluminum, triisobutylaluminum, and diethylaluminum chloride.

3. The process defined in claim 1 wherein the hydrocarbyl aluminum cocatalyst is at least one of triethylaluminum and triisobutylaluminum.

4. The process defined in claim 1 wherein the complex has the formula $Mg_aTi(OR)_bX_c(ED)_d$ wherein R is an aliphatic or aromatic hydrocarbon radical having 1 to 14 carbon atoms or $COR'$ wherein R' is an aliphatic or armoatic hydrocarbon radical having 1 to 14 carbona atoms; each OR group is alike or different; X is Cl, Br, or I, or mixtures thereof; ED is an electron donor, which is a liquid Lewis base in which the precursors of the titanium based complex are soluble; a is 0.5 to 56; b is 0, 1, or 2; c is 1 to 116; and d is 2 to 85.

5. The process defined in claim 4 wherein the electron donor is tetrahydrofuran.

* * * * *